(12) United States Patent
Pacino et al.

(10) Patent No.: US 11,483,084 B2
(45) Date of Patent: *Oct. 25, 2022

(54) SYSTEM AND METHODS OF REAL-TIME CREATION OF ELECTRONIC PROGRAMMING GUIDES FOR RADIO BROADCASTS

(71) Applicant: Audacy Operations, Inc., Philadelphia, PA (US)

(72) Inventors: John Michael Pacino, Norwalk, CT (US); Nicholas Constantine Booth, New York, NY (US); John David Crowley, Scarsdale, NY (US)

(73) Assignee: Audacy Operations, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,243

(22) Filed: Apr. 7, 2021

(65) Prior Publication Data

US 2022/0103273 A1 Mar. 31, 2022

Related U.S. Application Data

(63) Continuation of application No. 17/036,165, filed on Sep. 29, 2020, now Pat. No. 10,985,854.

(51) Int. Cl.
*H04H 60/72* (2008.01)
*H04H 20/33* (2008.01)
(Continued)

(52) U.S. Cl.
CPC ............ *H04H 60/72* (2013.01); *H04H 20/33* (2013.01); *H04N 5/602* (2013.01); *H04N 21/21* (2013.01)

(58) Field of Classification Search
CPC .......... H04N 5/60; H04N 5/602; H04N 21/21; H04N 21/236; H04N 21/81; H04N 21/84; H04H 60/72; H04H 20/33
(Continued)

(56) References Cited

U.S. PATENT DOCUMENTS 8,312,490 B2 * 11/2012 Yap ...................... H04N 5/4448
725/58
8,943,523 B2 1/2015 Stahl et al.
(Continued)

OTHER PUBLICATIONS

International Search Report and Written Opinion dated Oct. 27, 2021 for International Patent Application No. PCT/US2021/052538, 6 pages.

*Primary Examiner* — Trang U Tran
(74) *Attorney, Agent, or Firm* — Morgan, Lewis & Bockius LLP

(57) ABSTRACT

A method including while receiving a live digital audio stream from one or more remote servers and outputting the live digital audio stream via a speaker of a client device, receiving the updated content schedule from the one or more remote servers, generating and displaying a real-time programming guide user-interface including the updated content schedule, the real-time programming guide user-interface including at least one content segment component corresponding to at least one of the content segment data in the updated content schedule, and, in response to a content selection command at the at least one content segment component, transmitting a content segment digital audio signal request to the one or more remote servers for a prior portion of the live digital audio stream corresponding to the content segment data; and, in response to receiving the prior portion of the live digital audio stream, ceasing outputting
(Continued)

the live digital audio stream and outputting the prior portion of the live digital audio stream corresponding to the content segment data.

16 Claims, 7 Drawing Sheets

(51) Int. Cl.
*H04N 5/60* (2006.01)
*H04N 21/21* (2011.01)

(58) Field of Classification Search
USPC .............................. 715/201; 725/88, 90, 102
See application file for complete search history.

(56) References Cited

U.S. PATENT DOCUMENTS

| | | |
|---|---|---|
| 9,060,193 B2 * | 6/2015 | Whiteing ............. H04N 21/278 |
| 9,451,307 B2 | 9/2016 | McClanahan et al. |
| 9,668,002 B1 * | 5/2017 | Baron ................ H04N 21/4394 |
| 9,860,596 B1 | 1/2018 | Venkataraman et al. |
| 9,860,598 B1 | 1/2018 | Panchaksharaiah et al. |
| 10,057,606 B2 | 8/2018 | Lindsay et al. |
| 10,127,007 B2 | 11/2018 | Niuwenhuys et al. |
| 10,390,109 B2 * | 8/2019 | Young ................ H04N 21/8133 |
| 10,511,888 B2 | 12/2019 | Srivastava et al. |
| 10,779,058 B2 | 9/2020 | Panchaksharaiah et al. |
| 10,834,453 B2 | 11/2020 | de Clermont-Tonnerre et al. |
| 2013/0110565 A1 | 5/2013 | Means, Jr. et al. |
| 2014/0181243 A1 | 6/2014 | Nieuwenhuys |
| 2018/0255371 A1 | 9/2018 | Panchaksharaiah et al. |

\* cited by examiner

300

302 At one or more remote servers:
Receive a live digital audio stream comprising at least one of a plurality of metadata tags

304 Determine whether the metadata tag meets programming guide criteria

306 In response to determining that the at least one metadata tag meets programming guide criteria:
generate respective content segment data corresponding to a portion of the live digital audio stream

308 Upon generating the respective content segment data:
update a content schedule by appending the respective content segment data to the content schedule

310 Transmit the updated content schedule and the live digital audio stream to a client device

312 At the client device including a processor, a speaker and a display:
receive the live digital audio stream from the one or more remote servers and output the live digital udio stream via the speaker of the client device

314 Receive the updated content schedule from the one or more remote servers

316 Generate and display a real-time programming guide user-interface including the updated content schedule, the real-time programming guide user-interface including at least one content segment component corresponding to at least one of the content segment data in the updated content schedule

318 In response to a content selection command at the at least one content segment component:
transmit a content segment digital audio signal request to the one or more remote servers for the a prior portion of the live digital audio stream corresponding to the content segment data

320 In response to receiving the prior portion of the live digital audio stream:
cease to output the live digital audio stream

322 output the prior portion of the live digital audio stream corresponding to the content segment data

Fig. 3

SYSTEM AND METHODS OF REAL-TIME CREATION OF ELECTRONIC PROGRAMMING GUIDES FOR RADIO BROADCASTS

CROSS-REFERENCE TO RELATED APPLICATIONS

This application is a continuation of U.S. patent application Ser. No. 17/036,165, filed Sep. 29, 2020, now U.S. Pat. No. 10,985,854, which is incorporated by reference herein in its entirety.

BACKGROUND OF THE INVENTION

The present invention generally relates to streaming live audio content and, more particularly, to the real-time creation of an electronic programming guide corresponding to the live audio content.

The creation of an electronic programming guide varies based on the type of media. For example, televised media such as television channels which air multiple television shows have programming guides created well in advance of the scheduled airing. For example, television programming guides may be available a day, week or month in advance. This is due to the consistent segment times in television. For example, television media is typically edited to meet specific time requirements prior to broadcast, and television shows may be scripted to accommodate advertisement breaks. Conversely, live radio media, such as freeform or ad hoc radio shows, often have less consistent segment times. Repurposing this live freeform content for on-demand distribution requires editing by a human producer. This method requires the human producer to identify segment breaks, input information about these breaks into a system and upload the information each time a segment break occurs in order for a programming guide on a user's side to show that new segment. This leads to a difference in time between when the segment occurs and when the electronic programming guide displays the segment that is based on the human producer's skill and efficiency at updating segment information as he or she receives it.

BRIEF SUMMARY OF THE INVENTION

In one embodiment there is a system for generating a live programming schedule in real-time, comprising: a one or more remote servers configured to: while receiving a live digital audio stream comprising at least one of a plurality of metadata tags: determine whether the at least one metadata tag meets programming guide criteria, in response to determining that the at least one metadata tag meets programming guide criteria, generate respective content segment data corresponding to a portion of the live digital audio stream; upon generating the respective content segment data, updating a content schedule by appending the respective content segment data to the content schedule, and transmit the updated content schedule and the live digital audio stream to a client device; the client device including a processor, a speaker and a display, the client device configured to: while receiving the live digital audio stream from the one or more remote servers and outputting the live digital audio stream via the speaker of the client device: receive the updated content schedule from the one or more remote servers, generate and display a real-time programming guide user-interface including the updated content schedule, the real-time programming guide user-interface including at least one content segment component corresponding to at least one of the content segment data in the updated content schedule, and in response to a content selection command at the at least one content segment component, transmit a content segment digital audio signal request to the one or more remote servers for a prior portion of the live digital audio stream corresponding to the content segment data; and in response to receiving the prior portion of the live digital audio stream: cease outputting the live digital audio stream and outputting the prior portion of the live digital audio stream corresponding to the content segment data.

In some embodiments, the programming guide criteria includes a criterion that is met when the one or more servers identifies a content start metadata tag and a subsequent content end metadata tag in the live digital audio stream.

In some embodiments, the content segment data includes at least one of: content title data, content start data, content end data.

In some embodiments, the content segment component includes a display of the content title data, content start data, and/or content end data.

In some embodiments, the one or more remote servers are further configured to store each metadata tag of the plurality of metadata tags while receiving the live digital audio stream.

In a further embodiment, the live media content server is configured to modify a pre-modified digital audio stream to create the live digital audio stream and stream the live digital audio stream to the client device, wherein the time-shifted media content server is configured to store the pre-modified digital audio stream and stream the pre-modified digital audio stream as a time-shifted audio stream to the client device, wherein the alternative content server is configured to receive the live digital audio stream, identify and store the plurality of metadata tags, and transmit the at least one of the plurality of metadata tags to the client device.

In another embodiment, there is a method of generating a live programming schedule in real-time, comprising: at one or more remote servers: receiving a live digital audio stream comprising at least one of a plurality of metadata tags; determining whether the at least one metadata tag meets programming guide criteria, in response to determining that the at least one metadata tag meets programming guide criteria, generating respective content segment data corresponding to a portion of the live digital audio stream; upon generating the respective content segment data, updating a content schedule by appending the respective content segment data to the content schedule; and transmitting the updated content schedule and the live digital audio stream to a client device; at the client device including a processor, a speaker and a display: receiving the live digital audio stream from the one or more remote servers and outputting the live digital audio stream via the speaker of the client device: receiving the updated content schedule from the one or more remote servers, generating and displaying a real-time programming guide user-interface including the updated content schedule, the real-time programming guide user-interface including at least one content segment component corresponding to at least one of the content segment data in the updated content schedule, and in response to a content selection command at the at least one content segment component, transmitting a content segment digital audio signal request to the one or more remote servers for the prior portion of the live digital audio stream corresponding to the content segment data; and in response to receiving the prior portion of the live digital audio stream: ceasing to output the live digital audio stream; and outputting the prior portion of the live digital audio stream corresponding to the content segment data.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 3 depicts a flowchart of method steps for generating and transmitting an updated content schedule used to update an electronic programming guide.

DETAILED DESCRIPTION OF THE INVENTION

Figure 1:
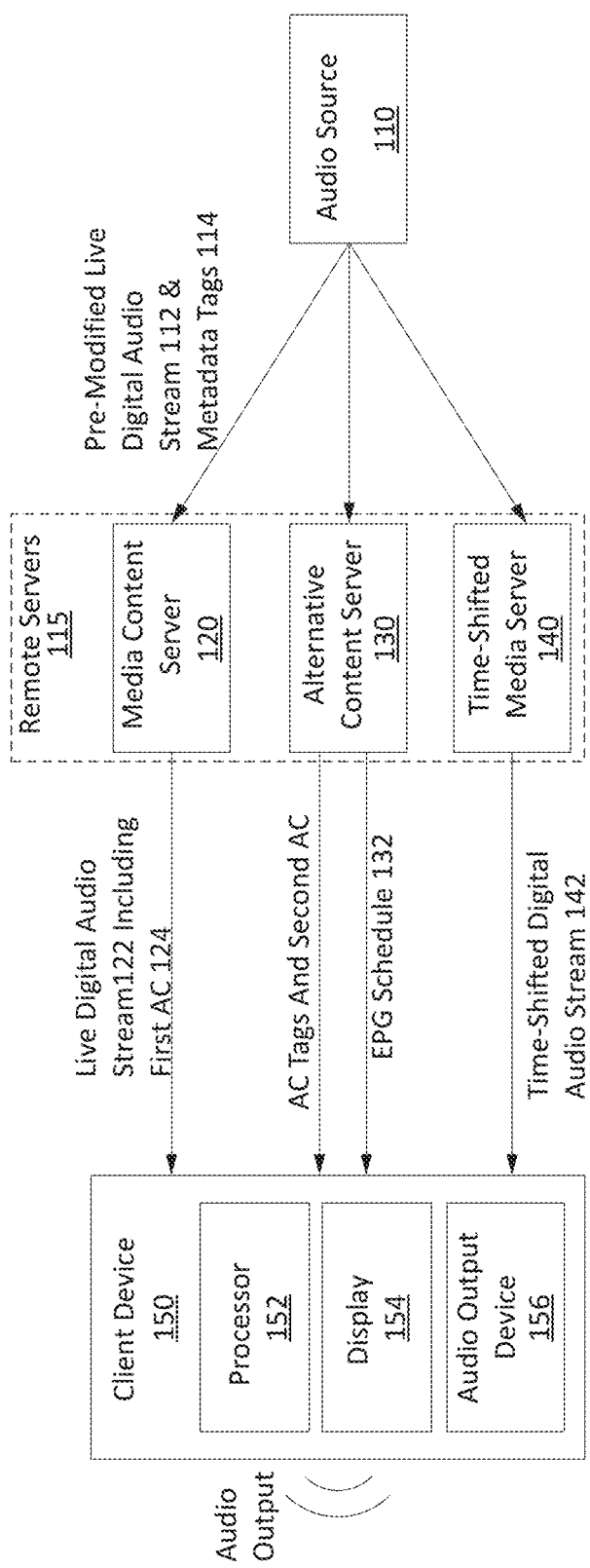
FIG. 1 is a conceptual block diagram of a system configured to transmit an electronic programming guide to a client device according to at least one embodiment of the present invention.

Referring to the drawings in detail, wherein like reference numerals indicate like elements throughout, there is shown in FIGS. 1-3 are systems and methods of real-time creation of electronic programming guides for radio broadcasts, generally designated, in accordance with an exemplary embodiment of the present invention.

FIG. 1 is a conceptual block diagram of a system configured to stream live and time-shifted audio content to a client device according to at least one embodiment of the present invention.

In one embodiment, the system includes one or more computers having one or more processors and memory (e.g., one or more non-volatile storage devices) to stream live and time-shifted audio content to a client device according to at least one embodiment of the present invention. In some embodiments, memory or a computer-readable storage medium of memory stores programs, modules and data structures, or subsets thereof, for a processor to control and run the various systems and methods disclosed herein. In one embodiment, the system includes a non-transitory computer-readable storage medium having stored thereon computer-executable instructions which, when executed by a processor, perform one or more of the methods disclosed herein.

In the discussion that follows, a client device (e.g., client device 150) that includes a processor, a display and an audio output device is described. It should be understood, however, that the client device optionally includes one or more other physical user-interface devices, such as a physical keyboard, a touch-sensitive display, a mouse, a joystick, a microphone, and a remote control.

Multiple servers (e.g., media content server 120, alternative content server 130 and time-shifted media server 140) are referenced in the below description. It will be understood that a server refers to a computing device that provides data to other computing devices including, but not limited to, other servers and client computing devices. The servers may transmit the data over a local area network (LAN) or a wide area network (WAN), over the internet, among other data transmission mediums. The servers may provide different services described herein and include software capable of providing those services. The servers may also host software suitable for radio broadcasting and streaming. The term "streaming" is consistently used as well; it will be understood that streaming can refer to either the steady, continuous flow of data transmission or reception over a computer network. The terms "stream" and "transmit" may be used interchangeably throughout the specification.

FIG. 1 is a block diagram illustrating the system 100. The system 100 may include an audio source 110, a remote server 115, a media content server (MCS) 120, an alternative content server (ACS) 130, a time-shifted media server (TSMS) 140 and/or a client device 150. The client device 150 may include a processor 152, a display 154 and an audio output device 156.

The audio source 110 may be a server or other computing device where live audio for a radio broadcast is received and processed to generate a pre-modified live digital audio stream. The audio source 110 may include software used to capture and store the live audio locally and additional software for transmission of the live audio as a pre-modified live digital audio stream 112. The live audio may refer to real-time recorded radio entertainment, including, but not limited to, news shows, talk shows, weather forecasts, sports talk shows, podcasts, and music stations. For example, live audio may include the audio of a radio DJ explaining the next five songs to play and a proceeding song. The terms "live audio," "live content," and "live audio content" may be used interchangeably throughout the description. In some embodiments, the audio source 110 may receive live audio from multiple external sources which are in electronic communication with the audio source 110. For example, the audio source 110 may serve as a hub for multiple radio shows which broadcast from different locations. Each of the shows transmitting live audio to the audio source 110 for transmission as pre-modified live digital audio streams respectively. For ease of describing the embodiments of the present invention, it will be assumed that the audio source 110 receives one live audio content for transmission as a pre-modified live digital audio signal. However, the audio source 110 may receive a plurality of live audio corresponding to different radio shows simultaneously. In response to receiving the plurality of live audio content, the audio source 110 may transmit a plurality of pre-modified live digital audio signals corresponding to the plurality of live audio content. In some embodiments, the audio source 110 may receive a request for one or more of the plurality of pre-modified live digital audio streams. The request may be for specific streams of the plurality of pre-modified live digital audio streams. The audio source 110 may, upon receiving the request for one or more of the plurality of pre-modified live digital audio streams, transmit the stream to the requesting device or server.

In some embodiments, the audio source 110 may, as it captures or receives live audio, perform initial alterations to the live audio and transmit it as the pre-modified live digital audio stream 112. Initial alterations performed by the audio source 110 may include appending metadata tags 114 to the captured live audio. The metadata tags 114 may be tags which are descriptive of the live audio content. For example, metadata tags 114 appended to the captured live audio may describe things such as content start/stop times corresponding to when live audio content is being streamed by the audio source 110. The pre-modified live digital audio stream 112 may refer to the audio stream which is transmitted by the audio source 110 prior to the addition of any alternative content. Alternative content may refer to audible and/or visual content other than the content that is streamed by the audio source 110. For example, alternative content may be sponsored advertisements which include audio content and/or video content. The audio source 110 may also, during the initial alterations to the live audio, append metadata tags 114 associated with alternative content into the live audio. An alternative content (AC) tag is a type of metadata tag 114 which has information relating to alternative content, such as start and stop times. The audio source 110 may include a software program designed to determine alternative content metadata tag placement based on data regarding the captured live audio, the respective tags, and optimal advertisement placement times within the live audio. For example, a determination that at 12 minutes and 36 seconds (12:36) into live radio content, the content should be stopped and an advertisement should be played for 30 seconds before returning to the live radio content may look like a content stop tag at timestamp 12:36 followed by an alternative content start tag at timestamp 12:37, followed by an alternative content end tag at timestamp 13:07, followed by a content start tag at timestamp 13:08. Metadata tags 114 may also include additional information pertaining to the type of content (e.g., weather, news, politics, interview), station information, prior and upcoming segment information, and show information (e.g., title, hosts, guests). Initial alterations may also include automated volume and sound adjustments and profanity filtering in compliance with standard broadcasting regulations. Once the audio source 110 has performed the initial alterations on the live audio, the pre-modified live digital audio stream 112 is generated. The audio source 110 may transmit the pre-modified live digital audio stream 112, which includes the alterations including, e.g., the metadata tags 114. The audio source 110 may continuously transmit the pre-modified live digital audio stream 112 in real time as it receives live audio and performs any necessary initial alterations as described above.

The remote server 115 may continuously receive the pre-modified live digital audio stream 112, including the corresponding metadata tags 114, from the audio source 110. In one embodiment, the remote server 115 may include a plurality of servers each configured to perform a function based on the pre-modified live digital audio stream 112. In another embodiment, the remote server may be one server which includes the functionality of the plurality of servers which comprise the remote server 115 in the previously stated embodiment. The remote server 115 may be in electronic communication with the audio source 110. The remote server 115 may be in electronic communication with the client device 150.

The MCS 120 may continuously receive and analyze the pre-modified live digital audio stream 112 as the audio source 110 transmits it. The MCS 120 may modify the pre-modified stream 112 by inserting alternative content based on the incoming metadata tags 114. The MCS 120 may also stream the pre-modified live digital audio stream 112, which includes the audio content and metadata of the pre-modified stream 112 and the additional alternative content added by the MCS 120. The data streamed in this manner may be referred to as a live digital audio stream 122. For example, the MCS 120 may, while receiving and analyzing stream 112 and streaming its content as stream 122, receive a content stop tag. The MCS 120 may, upon receiving a content stop tag, stop streaming the content from stream 112. Furthermore, upon receiving an alternative content start tag, the MCS 120 may stream an alternative content segment until receiving an incoming alternative content stop tag, then, upon receiving a content start tag, return to streaming the content from stream 112. The MCS 120 may additionally include a database of alternative content. The MCS 120 may additionally include software for determining what alternative content to use based on user information. In one embodiment, user information may be stored on and transmitted by client device 150. The MCS 120 may be able to receive user information from client device 150. In one embodiment, user information may be stored on any one of the servers described herein. The MCS 120 may be in electronic communication with the server on which the user information is stored. In some embodiments, user information is stored on a remote user information server which is not shown in FIG. 1. The MCS 120 may be in electronic communication with the remote user information server not shown in FIG. 1.

The ACS 130 may continuously receive the pre-modified live digital audio stream 112 and store the corresponding metadata tags 114 for later use. The ACS 130 may be in electronic communication with the client device 150. The ACS 130 may be in electronic communication with the audio source 110. The ACS 130 may also include a database of alternative content. The alternative content stored in the ACS 130 database may include the same alternative content stored in an MCS 120 database or it may include different alternative content. For ease of reference, alternative content stored on or used from the MCS 120 will be referred to as "first" alternative content 124, and alternative content stored and used from the ACS 130 will be referred to as "second" alternative content. The ACS 130 may be capable of receiving an alternative content request from client device 150. Upon receiving an alternative content request, the ACS 130 may be capable of transmitting a second alternative content to the client device 150. The ACS 130 may additionally include software for determining what second alternative content to transmit based on user information acquired from the client device 150, metadata tags 114 from the audio source 110, or a combination of the two. In addition to storing the metadata tags 114 from stream 112, the ACS 130 may also stream the tags to the client device 150 as the ACS 130 receives them. In some embodiments, the ACS 130 only streams metadata tags 114 related to alternative content (alternative content start/stop tags) to the client device 150. In other embodiments, the ACS 130 streams all incoming metadata tags 114 to the client device 150. In additional embodiments, the ACS 130 may be configured to stream only certain metadata tags 114 to the client device 150.

The ACS 130 may also include software which uses the incoming metadata tags 114 to construct or update an electronic programming guide (EPG) schedule 132 in real time. The EPG schedule 132 may be in a file format which the client device 150 is capable of receiving and processing. For example, the EPG schedule 132 may be transmitted as a .txt, .xlsx, .XML or any other format which the client device 150 is capable of receiving and processing. The EPG schedule 132 may be composed of content segments corresponding to different segments of a live audio content of the pre-modified stream 112 transmitted by audio source 110. For example, a pre-modified stream 112 may be a news show composed of multiple segments which may include the weather, local news, regional news, and global news. Each one of these segments may correspond to a content segment of the EPG schedule 132. Each content segment may additionally include any one or a combination of start time, end time, duration, content title, and short description. Updating the EPG schedule 132 refers to appending content segment information to an existing EPG schedule 132 as content segment information is identified. In one embodiment, if no EPG schedule 132 exists, the ACS 130 may create a blank, or placeholder, schedule to update as metadata is received from audio source 110. In another embodiment, a blank EPG schedule 132 may be created upon receiving a first metadata tag from audio source 110. In a further embodiment, an EPG schedule 132 including a first content segment may be created upon first recognition of a pre-determined metadata tag combination as described below. An existing EPG schedule 132 may be updated in real time by comparing an incoming metadata tag to a previously received metadata tag. The ACS 130 may receive a first metadata tag and wait for a pre-determined metadata tag before updating the EPG schedule 132. The ACS 130 may receive multiple metadata tags 114 between the first metadata tag and the pre-determined metadata tag before updating the EPG schedule 132. For example, if the ACS 130 has received an alternative content start tag, indicating that the main content has stopped streaming, the ACS 130 may then, as it continues to receive metadata tags 114, wait to see an alternative content stop tag to know when the main content will begin streaming again and update the EPG schedule 132 based on that information. Alternatively, the ACS 130 may use content stop tags in place of alternative content start tags and use content start tags in place of alternative content stop tags. Content segments may be identified by a plurality of combinations of content and alternative content start/stop tags, for example, a content stop tag followed by an alternative content stop tag or a content end tag followed by an alternative content end tag. Content segments may also be based on metadata relating to a change in segment title or information or changes in content type.

The TSMS 140 may receive the pre-modified live digital audio stream 112 as the audio source 110 transmits it. The TSMS 140 may, upon receiving the pre-modified live digital audio stream 112, store it for later playback as a time-shifted digital audio stream 142. The TSMS 140 may be in electronic communication with the client device 150. The TSMS 140 may be in electronic communication with the audio source 110. The TSMS 140 may receive a request for the time-shifted digital audio stream 142 (e.g., a request from client device 150). In response to receiving the request, the TSMS 140 may, upon receiving the request for the time-shifted digital audio stream 142, transmit the time-shifted digital audio stream 142 to the requesting device. The time-shifted digital audio stream 142 may be identical in terms of audio content and metadata to the pre-modified live digital audio stream 112. For example, if the pre-modified live digital audio stream 112 was of a radio news show, the time-shifted digital audio stream 142 would comprise audio content of the same radio news show. In some embodiments, the TSMS 140 may include a database to store incoming stream 112. In one embodiment, the TSMS 140 is separate from the MCS 120. In one embodiment, the TSMS 140 and MCS 120 are one server.

The client device 150 may be a computing device having a processor 152, a display 154, and an audio output device 156. The client device 150 may include additional components such as memory, memory controller, radio frequency (RF) circuitry, external ports, audio input devices, and computer readable storage mediums. The client device 150 may be a device such as a smartphone, tablet, laptop, smart TV, or desktop computer. The display 154 may be a touch-sensitive, or "touch screen," display or a non-touch screen display where an external device (e.g., mouse, keyboard, joystick, microphone) is used to interact with the display 154. The audio output device 156 may be speakers integrated into the client device 150, external speakers connected to the client device 150 via a wired or wireless connection, or headphones connected to the client device 150 via a wired or wireless connection. The display 154 may display a user interface (UI) 200 (see FIGS. 2A-2E) which allows a user to control playback options of the live digital audio stream 122 and time-shifted digital audio stream 142. The UI 200 may include interactive controls which allow a user to swap between playing the live digital audio stream 122 or the time-shifted digital audio stream 142, change the volume level, fast-forward or rewind the time-shifted digital audio stream 142, and play or pause either of the streams 122 or 142.

The client device 150 may be in electronic communication with at least one of the MCS 120, the ACS 130 and the TSMS 140 at any given time. The client device 150 may establish an electronic communication with the servers 120, 130 and 140 by opening a web browser and navigating to a certain web address or by launching an application stored on the client device 150. The client device 150 may receive the live digital audio stream 122 from the MCS 120. Upon receiving the live digital audio stream 122, the client device 150 may output the live digital audio stream 122 via the audio output device 156. The client device 150 may receive the time-shifted digital audio stream 142 from the TSMS 140. Upon receiving the time-shifted digital audio stream 142, the client device 150 may output the audio from the time-shifted digital audio stream 142 via audio output device 156. While receiving either the live digital audio stream 122 or the time-shifted digital audio stream 142, the client device 150 may receive an updated EPG schedule 132 from the ACS 130. Often, unplanned or ad hoc radio shows do not follow a set schedule for content segments and advertisement breaks. Repurposing the content of these live free-form radio shows for on-demand distribution requires editing to be done by a human being, which leads to a lag in the time between when a segment is identified and when the human editor is able to update the schedule. While outputting either the live digital audio stream 122 or the time-shifted digital audio stream 142, the client device 150 may display an updated EPG 208 (FIGS. 2A-2E) including content segment components 210 (FIGS. 2A-2E) which correspond to the content segment info in the updated EPG schedule 132. By generating and updating an EPG schedule as described above, a real-time EPG 208 may be created without human input, thereby reducing the cost and time needed to update the EPG client side.

In some embodiments, the client device 150 may, while receiving and outputting live digital audio stream 122 or time-shifted digital audio stream 142, simultaneously receive metadata tags 114 from the ACS 130 as the ACS 130 receives the metadata tags 114 from the audio source 110. For example, while receiving and outputting a time-shifted digital audio stream 142 of a radio show, the client device 150 may receive metadata tags 114 from the ACS 130 which correspond to the live digital audio stream 122 of the same radio show. These metadata tags 114 may be used to determine content and alternative content times in real time as opposed to existing on-demand solutions which require a human editor to manually separate content from alternative content (e.g., advertisements) after the conclusion of a live stream. The metadata tags 114 received from the ACS 130 may include tags related to alternative content (alternative content start/stop tags). In this way, the client device 150 may receive live programming and ad break updates while outputting a time-shifted digital audio stream 142. Existing DVR-like solutions rely on client-side buffering to store and play-back content, which requires the user's device (e.g., client device 150) to be actively loading the audio stream.

The client device 150 may use the metadata tags 114 received from ACS 130 to identify upcoming alternative content periods in the time-shifted digital audio stream 142. Alternative content periods refer to periods in the live digital audio stream 122 where the first alternative content 124 was inserted into the pre-modified stream 112 by the MCS 120. For example, during a live digital audio stream 122 of a radio show, there may have been an alternative content break starting at time $T_1$ and ending at time $T_2$, each of those times listed in metadata tags 114 coming from the pre-modified stream 112. The alternative content period may be the time starting from $t_1$ and ending at $t_2$. Since the time-shifted digital audio stream 142 is content from a period prior to the live content being streamed by MCS 120, the alternative content period is known by the client device 150 in advance. In some embodiments, the client device 150, upon receiving advance notice of an alternative content period, may request second alternative content prior to the alternative content period. In some embodiments, it may be desirable to request second alternative content, which is different from the first alternative content 124, which played during the live digital audio stream 122. In this case, client device 150 may transmit a request for second alternative content to the ACS 130. In another embodiment, it may be desirable to replay the same alternative content 124, which played during the live stream 122. In some embodiments, the client device 150 may, when the period of a time-shifted digital audio stream 142 matches the alternative content period, ceases outputting the time-shifted digital audio stream 142 and outputs the second alternative content received from the ACS 130. Using this technique of streaming the time-shifted digital audio stream 142 from the TSMS 140 while receiving metadata tags 114 from the ACS 130 to determine alternative content periods and output alternative content received from the ACS 130, a user of client device 150 may listen to live content on demand immediately after a broadcast regardless of any client device 150 buffering.

In some embodiments, servers 120, 130, and 140 may be in electronic communication with one another. Any combination of electronic communication between servers 120, 130, and 140 may be established. For example, the MCS 120 may be in electronic communication with the ACS 130 and TSMS 140.

Attention is now directed toward embodiments of UIs and associated processes that may be implemented using an electronic device that communicates with and/or includes a processor 152, such as a computing device (e.g., client device 150 of FIG. 1). In some embodiments, the computing device includes an audio output device (e.g., audio output device 156 of FIG. 1). In some embodiments, the computing device includes an audio input device, such as a microphone. In some embodiments, the computing device includes a display. In some embodiments, the display includes an audio system (e.g., the display and the audio system are components of a television). In some embodiments, certain components of the audio system and the display are separate (e.g., the display is a component of a television and the audio system includes a sound bar that is separate from the television). In some embodiments, the computing device is in communication with a separate remote control through which it receives user inputs (e.g., a television remote control which accepts physical or audible inputs). In some embodiments, the computing device may be a mobile device. In some embodiments, the computing device may be a smartphone. In some embodiments, the computing device may be a laptop. In some embodiments, the computing device may be a desktop computer. In some embodiments, the computing device may be a tablet computing device.

FIGS. 2A-E illustrate the method depicted in FIG. 3 stepped through an example UI 200 for receiving an updated content schedule and generating an electronic programming guide in real time, in accordance with some embodiments. The UIs in these figures are used to illustrate the process described below. The UI 200 is displayed on the display 154 of a client device 150. The UI 200 includes a scrub bar 202 with a scrub bar handle 204, content indicators 206, and an EPG 208 which includes one or more content segment components 210. Other UI features such as volume control and playback commands such as a play/pause button, a rewind button, a fast-forward button, a skip back X seconds button, a skip forward X seconds button and a stop button may additionally be included. However, for ease of explaining the real-time creation of an EPG, only the scrub bar 202, scrub bar handle 204, content indicators 206, EPG 208 and one or more content segment components 210 will be shown on the UI 200. The scrub bar 202 may also include a colored portion which extends to the left of the scrub bar handle 204 and a shaded portion which extends from the right of the scrub bar handle 204. The end of the shaded portion may correspond to the live digital audio stream 122 and may not be visible if the live digital audio stream 122 is being output. Each content segment component 210 may include indicia depicting segment duration (e.g., time T1 to T2, where T1 may be 3:45 AM and T2 may be 4:13 AM), or indicia depicting additional segment information including but not limited to a title or description of the segment. Each content segment component 210 may correspond to different shows or different segments within one show, or a combination thereof. Additionally, the scrub bar 202 may include indicia proximate to the ends of the scrub bar 202 which indicate a projected start and end time (e.g., 2:00 AM start time below the left side and 5:45 AM end time below the right side of the scrub bar 202).

Figure 2A:
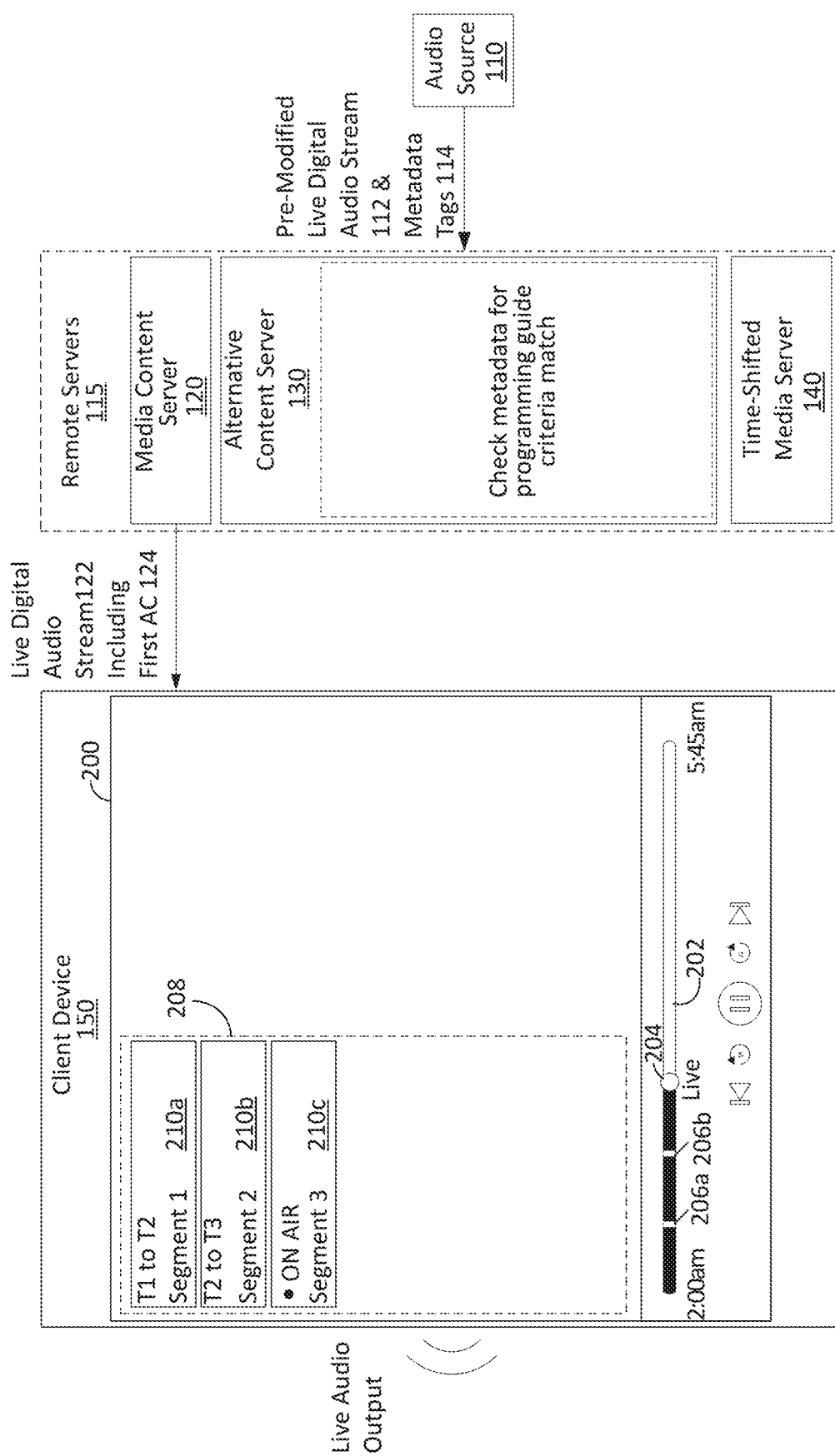
FIGS. 2A-2E illustrate an example user interface for a client device that is receiving an updated electronic programming guide schedule.

In FIG. 2A, the audio source 110 is generating a pre-modified live digital audio stream 112 and transmitting it to the remote server 115. The pre-modified live digital audio stream 112 includes a plurality of metadata tags 114. The MCS 120 receives the pre-modified live digital audio stream 112 including the plurality of alternative content start tags and alternative content stop tags. The MCS 120 modifies the pre-modified live digital audio stream 112 by inserting at least a first alternative content 124 into the pre-modified live digital audio stream 112 between a respective alternative content start/stop tag to produce the live digital audio stream 122 and stream the live digital audio stream 122 for playback on the client device 150. As the MCS 120 receives and modifies the pre-modified live digital audio stream 112, the ACS 130 also receives the pre-modified live digital audio stream 112, including the plurality of alternative content start and stop tags. The ACS 130 checks incoming metadata tags (e.g., alternative content start/stop tags) to see if there is a programming guide criteria match as described above. Three content segments 210*a-c* have all been previously identified by the ACS 130. Upon identification of each content segment 210*a-c*, the ACS 130 made an update to an existing EPG content schedule which was transmitted to the client device 150. As the client device 150 receives the live digital audio stream 122, it outputs it through the audio output device (e.g., speakers). Displayed on the UI 200, the position of the scrub bar indicator 204 along the length of the scrub bar 202 indicates that live content is currently being output. The content segments 210 are represented sequentially from left to right on the scrub bar 202, and separated by alternative content indicators 206.

Figure 2B:
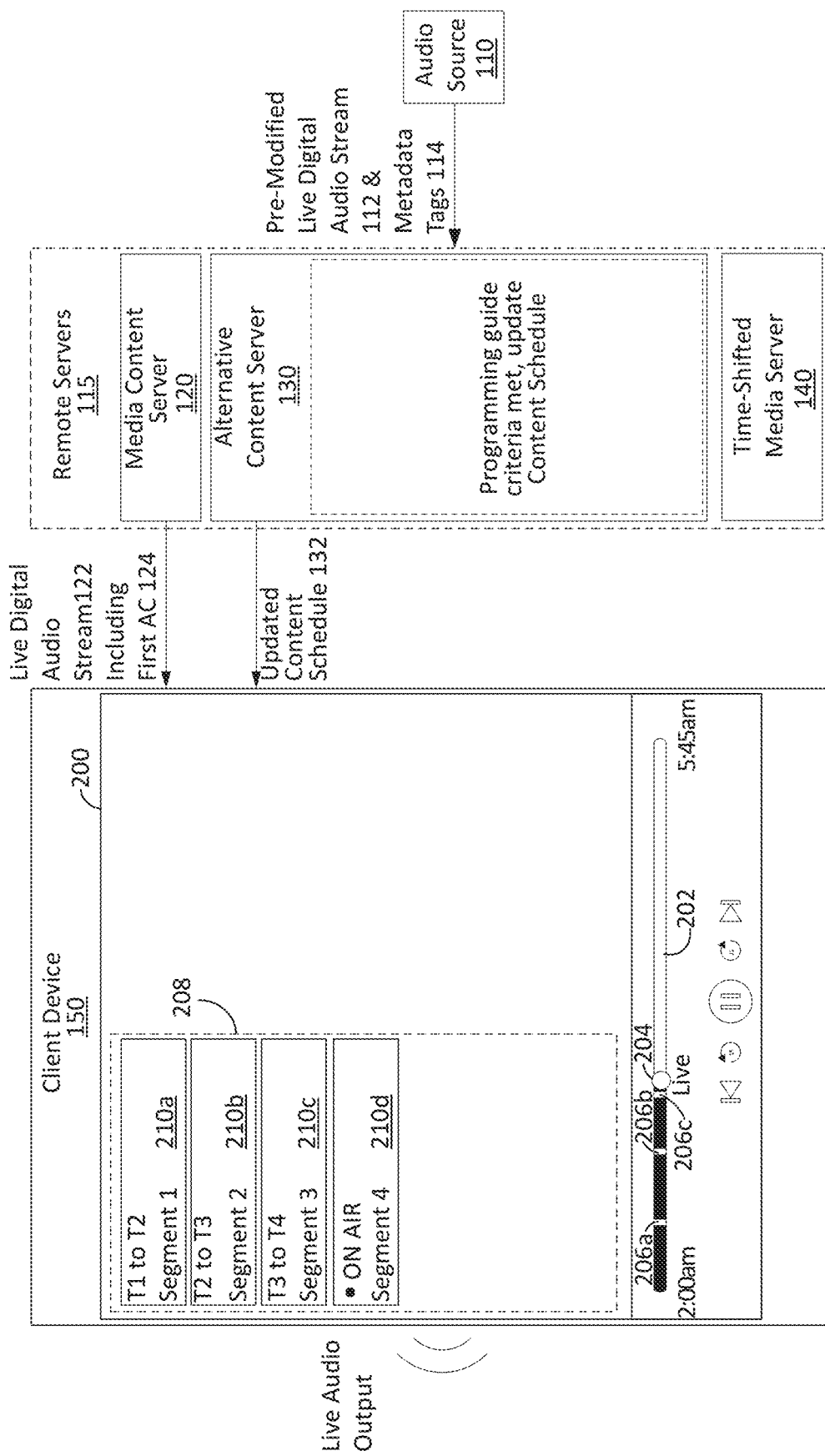

In FIG. 2B, an amount of time has passed from a point in time in which FIG. 2A takes place, as indicated by the advancement of the scrub bar indicator 204. The MCS 120 is receiving the pre-modified live digital audio stream 112 from the audio source 110, modifying it to create the live digital audio stream 122 and transmitting it to the client device 150. The client device is outputting the live digital audio stream 122. The ACS 130, as it is receiving the pre-modified live digital audio stream 112, including the plurality of metadata tags 114, identifies that a programming guide criteria was met (e.g., alternative content stop tag following a previously received alternative content start tag). Identification of the programming guide criteria corresponds to identification of a new content segment. In response to determining that programming guide criteria was met, the ACS 130 updates an existing EPG schedule 132 (e.g., appends code representative of the content segment to an EPG schedule data file (e.g., .xml)) corresponding to the pre-modified stream 112 to include content segment data corresponding to the new content segment. Upon updating the existing content schedule, the ACS 130 transmits the updated content schedule 132 to the client device 150. While still outputting the live digital audio stream 122, the client device 150, upon receiving the updated content schedule 132, updates the EPG display 208 with content segment component 210d (e.g., by executing the code stored on the EPG schedule data file (e.g., .xml)).

In one embodiment, content segments are identified by alternative content breaks. Therefore, the number of content segment components displayed on the EPG 208 may be one more than the number of alternative content indicators 206. For example, referring back to FIG. 2A, there are three content segment components 210a-210c and two alternative content indicators 206a and 206b displayed by the UI 200. Referring now to FIG. 2B, a new alternative content indicator 206c is displayed corresponding to the appearance of an additional content segment component 210d. Content segments may be identified and the corresponding content segment components 210 displayed at the beginning or end of alternative content. In FIG. 2B the scrub bar handle 204 has advanced a bit beyond the alternative content indicator 206c; it will be understood that this is for illustration purposes and that transmission of the updated content schedule 132 may have taken place when the alternative content start was identified or when the alternative content end occurred. Furthermore, transmission of the updated content schedule 132 may be delayed due to processing and signal transmission delays.

In some embodiments, content segments may be identified by metadata describing information other than alternative content. In this embodiment, the number of content segment components 210 and alternative content indicators 206 need not have a relationship as defined above.

Figure 2C:
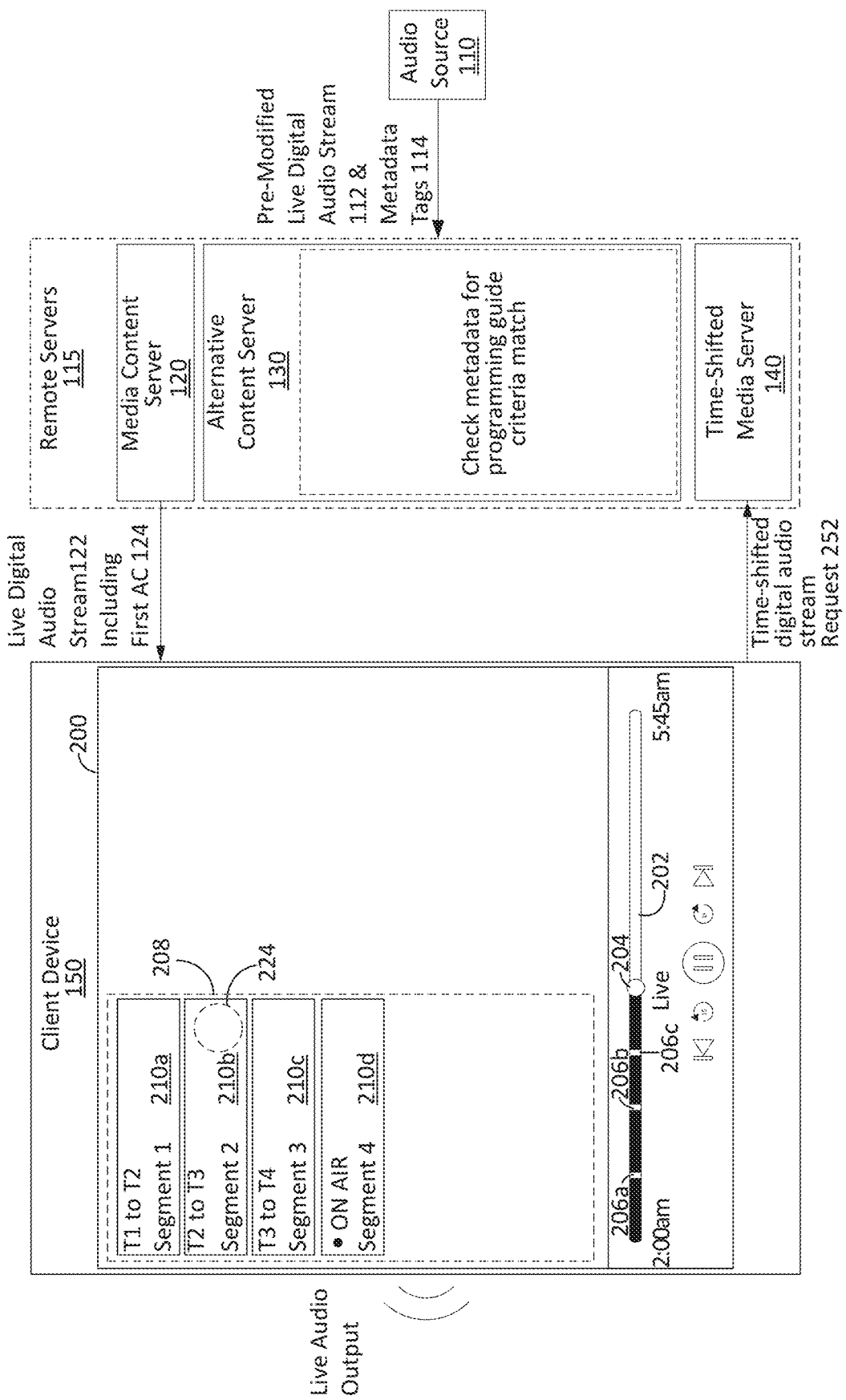

In FIG. 2C, the client device 150 is receiving and outputting the live digital audio stream 122 and the ACS 130 is receiving the pre-modified stream 112 and checking the incoming metadata tags 114 to see if there is a programming guide criteria match. A user has initiated a playback command by providing a user input at location 224 which corresponds to a user input at content segment component 210b. This indicates the user would like to play content from a point in time prior to the current time in the live digital audio stream 122; specifically, the user would like to play content starting from the start time T2 of content segment component 210b. The user input may be a tap of a finger on a touch-screen display, a mouse-click or any other user input capable of selecting an interactive UI element. As the playback command is initiated, the client device, while still receiving and outputting the live digital audio stream 122, transmits a time-shifted digital audio stream request 252 to the TSMS 140. The playback command may be any other command which indicates a user would like to stream content from a time period prior to the current live content. For example, the playback command could be tapping a rewind button, speaking a voice command to play content from a certain time, or clicking directly on the scrub bar to a point that is not the live content.

Figure 2D:
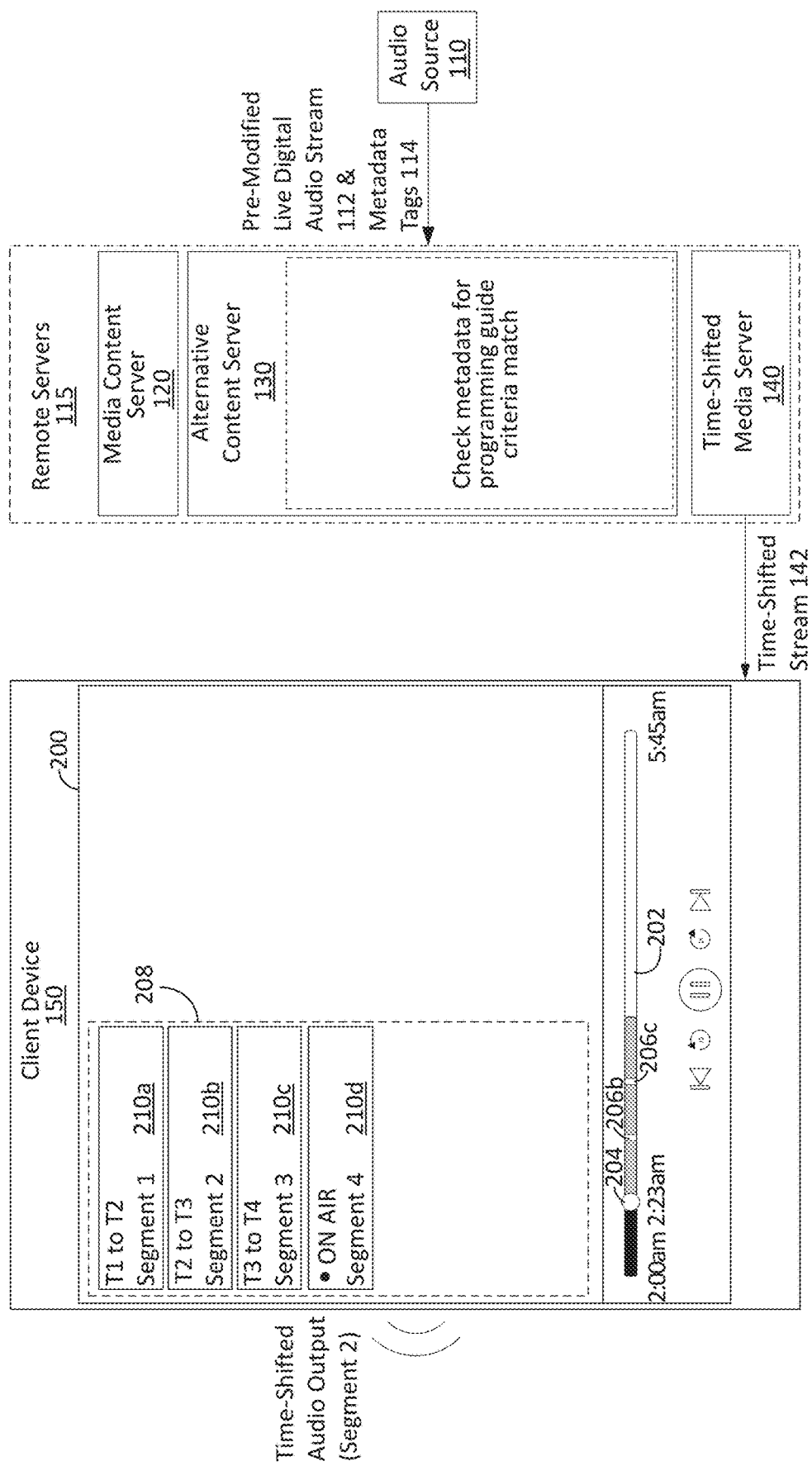

In response to receiving a time-shifted digital audio stream request 252, the TSMS 140 may stream the time-shifted digital audio stream 142 to the client device 150 (FIG. 2D). At this point the scrub bar handle 204 has moved to a location on the scrub bar 202 corresponding to the start of content segment component 210b, which overlaps with alternative content indicator 206a (not shown), and the client device 150 has switched from outputting the live digitial audio stream 122 from the MCS 120 to outputting the time-shifted digital audio stream 142 from the TSMS 140. The ACS 130 continues to receive and check the metadata tags 114 from the pre-modified stream 112 to see if programming guide criteria is met. It should be clarified that at this point, the ACS 130 is receiving and checking metadata from the live audio content being transmitted by audio source 110, while the client device 150 is outputting a recorded playback of a previously transmitted portion of the live audio content.

Figure 2E:
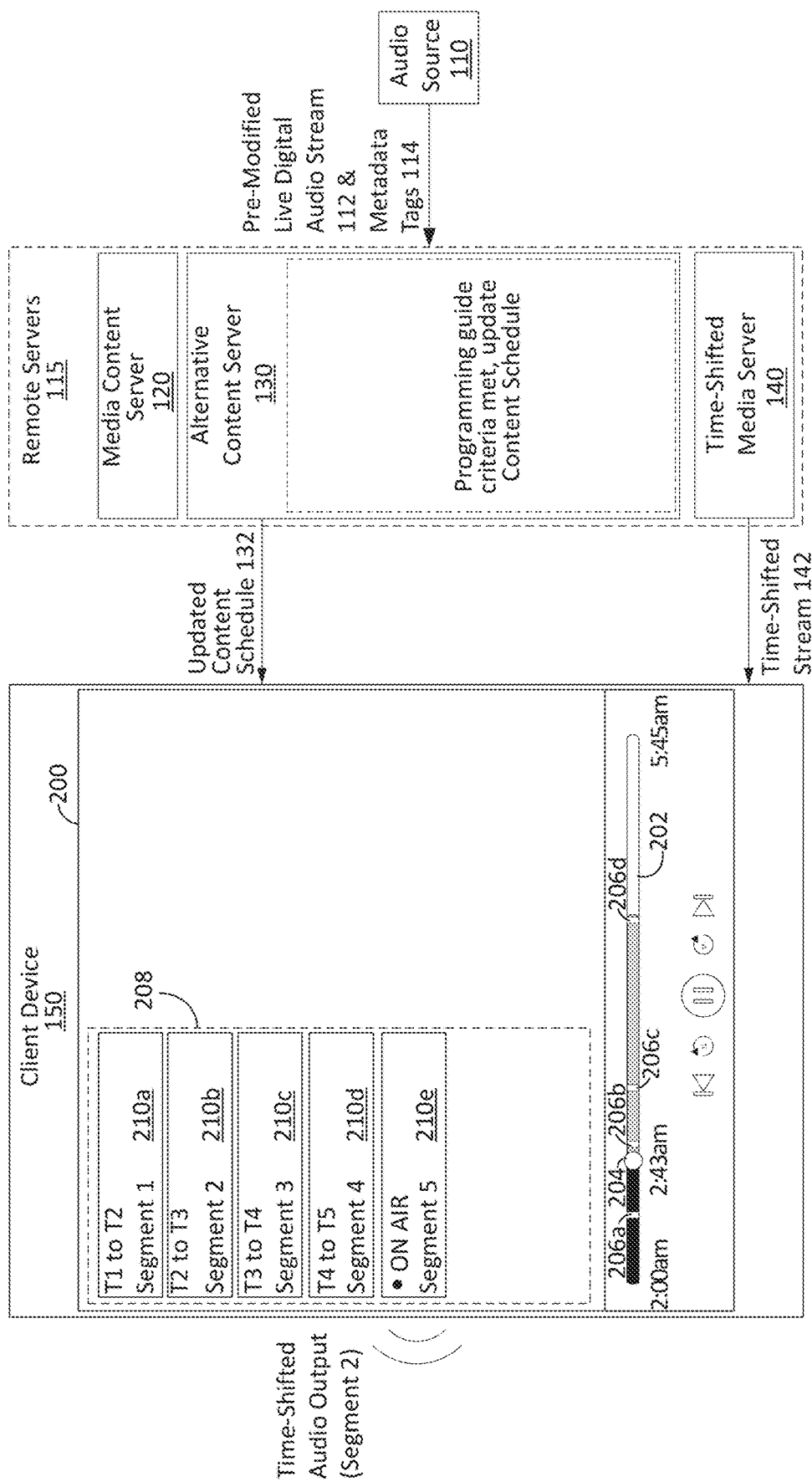

In FIG. 2E, the client device is still outputting a time-shifted digital audio stream 142 and an amount of time has passed since the client device 150 started outputting the time-shifted digital audio stream 142 (see FIG. 5D). Accordingly, further live content has been transmitted by the audio source 110 as part of the pre-modified live digital audio stream 112, as can be seen by the advancement of the gray portion of the scrub bar 202 from FIG. 2D. The ACS 130 has identified that programming guide criteria is met. As mentioned for FIG. 2B, identification of the programming guide criteria corresponds to identification of a new content segment and the appearance of a new alternative content indicator 206d. In response to determining that programming guide criteria was met, the ACS 130 updates an existing content schedule 132 corresponding to the pre-modified stream 112 to include content segment data corresponding to the new content segment. Upon updating the existing content schedule 132, the ACS 130 transmits the updated content schedule 132 to the client device 150. While still outputting the time-shifted stream 142, the client device 150, upon receiving the updated content schedule 132, updates the EPG 208 with content segment component 210e.

It should be understood that the updating of content schedule 132 by the ACS 130 is independent of any playback command initiated by a user and whichever stream (122 or 142) is being output by the client device 150. Referring to FIGS. 2C-E, the user indicated a single playback request which was processed and initiated output of the time-shifted digital audio stream 142 which was output through at least the point in time that FIG. 2E takes place. However, the user may have initiated any number of playback commands between the time of FIG. 2C to 2E so long as an amount of time passed was equal to the amount of time for the new content segment. For example, after the fourth content segment finished and the ACS 130 updated the content schedule 132 and transmitted it to the client device 150, indicated by the appearance of content segment component 210d on the UI 200, the fifth content segment may have started. The fifth content segment may have lasted for 30 minutes including any time used for breaks or advertisements. At any time, within the 30 minutes between the end of the fourth content segment and the end of the fifth content segment, including any breaks, the user may have paused playback, returned to the live digital audio stream 122, advanced playback or rewound playback further.

In some embodiments the functionality of servers 120, 130, and 140 used for streaming live and time-shifted audio may be handled by a single remote server. The single remote server may be in electronic communication with audio source 110. The single remote server may be in electronic communication with a client device 150. The single remote server may continuously receive the pre-modified live digital audio stream 112 from audio source 110, metadata tags 114 included. Upon receiving the pre-modified live digital audio stream 112, the single remote server may append first alternative content to the pre-modified live digital audio stream 112 for output as a live digital audio stream 122 in a similar manner as described above for the MCS 120. Upon receiving a request for the live digital audio stream 122, the single remote server may transmit live digital audio stream 122 to the requesting device (e.g., the client device 150). While receiving the pre-modified stream 112, the single remote server may store the pre-modified live digital audio stream 112 in a similar manner as described above for the TSMS 140 for time-shifted playback. While receiving the pre-modified live digital audio stream 112, the single remote server may also analyze and store incoming metadata tags 114 in a similar manner as described above for the ACS 130. The pre-modified live digital audio stream 112 and metadata tag 114 storage may be handled through a single database or multiple databases. While transmitting live digital audio stream 122, the single remote server may receive a request for a time-shifted digital audio stream 142. Upon receiving a request for a time-shifted digital audio stream 142, the single remote server may retrieve a time-shifted audio corresponding to the request for the time-shifted stream. Upon retrieving the time-shifted audio, the single remote server may transmit the time-shifted audio as a time-shifted digital audio stream 142 to the client device 150.

While transmitting a time-shifted digital audio stream 142, the single remote server may continue to receive and analyze metadata tags 114 from audio source 110. Upon transmitting a time-shifted digital audio stream 142 to a client device 150, the single remote server may transmit any stored metadata tags 114 corresponding to the time-shifted digital audio stream 142 to the client device 150. While transmitting a time-shifted digital audio stream 142 to the client device 150, the single remote server may transmit metadata tags 114 corresponding to the time-shifted digital audio stream 142 as it receives them from audio source 110. While transmitting a time-shifted digital audio stream 142, the single remote server may receive a request for second alternative content from a client device 150. Upon receiving a request for second alternative content, the single remote server may determine what alternative content to transmit as second alternative content based on user information and metadata tags 114 corresponding to the time-shifted digital audio stream 142. For example, user demographic information may be transmitted by client device or stored in a database which the single remote server has access to. The single remote server may use this information to determine appropriate second alternative content to transmit to the client device 150. While receiving the metadata tags 114 of the pre-modified stream 112 from audio source 110, the single remote server may use the metadata tags 114 to construct an EPG in a similar manner as described above for the ACS 130.

FIG. 3 is a flow diagram of a method 300 for generating and transmitting an updated content schedule used to update an EPG.

As described below, the method 300 utilizes metadata tags to determine content segment information which is then used to update a content schedule, thereby allowing for a real-time EPG to be generated without a need for any human operator input.

At one or more remote servers (e.g., remote server 115 in FIG. 2A), a remote server receives (302) a live digital audio stream (e.g., the pre-modified live digital audio stream 112 transmitted by audio source 110 and received by remote server 115 in FIG. 2A) comprising at least one of a plurality of metadata tags (e.g., metadata tags 114, such as an alternative content start/stop tag or a content start/stop tag, transmitted with the pre-modified live digital audio stream 112).

The remote server determines (304) whether the metadata tag meets programming guide criteria (e.g., the ACS 130 in FIG. 2A analyzes incoming metadata tags 114 from audio source 110 as the audio source 110 transmits them for a specific combination of metadata tags 114 which matches a predetermined criteria). In some embodiments, the programming guide criteria includes a criterion that is met when the remote server identifies a content start metadata tag and a subsequent content end metadata tag in the live digital audio stream.

In response to determining that at least one metadata tag meets programming guide criteria (e.g., ACS 130 determines programming guide criteria has been met in FIG. 2B), the remote server generates (306) respective content segment data corresponding to a portion of the live digital audio stream (e.g., data relating to content segment start and stop time, content segment title, content segment type, content segment channel, or content segment description).

Upon generating the respective content segment data, the remote server updates (308) a content schedule by appending the respective content segment data to the content schedule (e.g., appending content segment title and start and stop times to an existing content schedule).

The remote server transmits (310) the updated content schedule (e.g., updated content schedule 132 transmitted by the ACS 130 to the client device 150 in FIG. 2B) and the live digital audio stream (e.g., live digital audio stream 122 transmitted from MCS 120 to the client device 150 in FIG. 2B) to a client device (e.g., the client device 150).

At the client device including a processor, a speaker, and a display (e.g., the client device 150 in FIG. 2B), the client device receives (312) the live digital audio stream from the one or more remote servers (e.g., receiving live digital audio stream 122 from MCS 120) and outputs the live digital audio stream via the speaker of the client device.

While receiving the live digital audio stream, the client device receives (314) the updated content schedule from the one or more remote servers (e.g., receiving the updated content schedule 132 from ACS 130 in FIG. 2B).

While receiving the live digital audio stream, the client device generates and displays (316) a real-time programming guide user-interface (e.g., EPG 208 in FIG. 2B) including the updated content schedule, the real-time programming guide user-interface including at least one content segment component corresponding to at least one of the content segment data in the updated content schedule (e.g., content segment component 210d in FIG. 2B).

In response to a content selection command at the at least one content segment component (e.g., user input 224 on content segment component 210b in FIG. 2C), the client device 150 transmits (318) a content segment digital audio signal request to the one or more remote servers (e.g., content segment request 252 transmitted by the client device 150 to TSMS 140 of the remote server 115 in FIG. 2C) for the prior portion of the live digital audio stream corresponding to the content segment data (e.g., the portion of the live digital audio stream 122 that was transmitted between times T2 and T3, corresponding to segment 2).

In response to receiving the prior portion of the live digital audio stream (e.g., time-shifted digital audio stream 142 transmitted by the TSMS 140 to the client device 150), the client device 150 ceases (320) to output the live digital audio stream (e.g., the client device 150 stops playing live digital audio stream 122 via the audio output device 156).

Also, in response to receiving the prior portion of the live digital audio stream (e.g., time-shifted stream 142 transmitted by the TSMS 140 to the client device 150), the client device 150 outputs (322) the prior portion of the live digital audio stream corresponding to the content segment data (e.g., the client device 150 outputs the time-shifted stream 142 via the audio output device 156).

It should be understood that the particular order in which the operations in FIG. 3 have been described is merely an example and is not intended to indicate that the described order is the only order in which the operations could be performed. One of ordinary skill in the art would recognize various ways to reorder the operations described herein.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a," "an" and "the" are not limited to one element but instead should be read as meaning "at least one."

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise compose a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A system for generating a live programming schedule in real time, comprising:
one or more remote servers configured to:
while receiving a live digital audio stream comprising at least one of a plurality of metadata tags:
determine whether the at least one metadata tag meets programming guide criteria,
in response to determining that the at least one metadata tag meets programming guide criteria, generate respective content segment data corresponding to a portion of the live digital audio stream;
upon generating the respective content segment data, updating a content schedule by appending the respective content segment data to the content schedule, wherein the content schedule comprises prior content segment data relating to at least one prior portion of the live digital audio stream, and
transmit the updated content schedule to a client device;
the client device including a processor, a speaker and a display, the client device configured to:
receive the updated content schedule from the one or more remote servers, and
generate and display a real-time programming guide user-interface including the updated content schedule, the real-time programming guide user-interface including at least one content segment component corresponding to at least one of the content segment data in the updated content schedule, and at least one prior content segment component corresponding to at least one of the prior portion of the live digital audio stream.

2. The system of claim 1, wherein the programming guide criteria includes a criterion that is met when the one or more servers identifies a content start metadata tag and a subsequent content end metadata tag in the live digital audio stream.

3. The system of claim 1, wherein the content segment data includes at least one of content title data, content start data, and content end data.

4. The system of claim 1, wherein the content segment component includes a display of the content title data, content start data, and/or content end data.

5. The system of claim 1, wherein the one or more remote servers are further configured to store each metadata tag of the plurality of metadata tags while receiving the live digital audio stream.

6. The system of claim 1, wherein the one or more remote servers includes a live media content server, a time-shifted media content server and an alternative content server.

7. The system of claim 6 wherein the live media content server is configured to modify a pre-modified digital audio stream to create the live digital audio stream and stream the live digital audio stream to the client device, wherein the time-shifted media content server is configured to store the pre-modified digital audio stream and stream the pre-modified digital audio stream as a time-shifted audio stream to the client device, wherein the alternative content server is configured to receive the live digital audio stream, identify and store the plurality of metadata tags, and transmit the at least one of the plurality of metadata tags to the client device.

8. The system of claim 1, wherein the client device is further configured to receive and output the at least one prior portion of the live digital audio stream, in response to a content selection command at the at least one prior content segment component.

9. A method of generating a live programming schedule in real-time, comprising:
at one or more remote servers:

receiving a live digital audio stream comprising at least one of a plurality of metadata tags;

determining whether the at least one metadata tag meets programming guide criteria, in response to determining that the at least one metadata tag meets programming guide criteria, generating respective content segment data corresponding to a portion of the live digital audio stream;

upon generating the respective content segment data, updating a content schedule by appending the respective content segment data to the content schedule, wherein the content schedule comprises prior content segment data relating to at least one prior portion of the live digital audio stream; and transmitting the updated content schedule to a client device;

at the client device including a processor, a speaker and a display:

receiving the updated content schedule from the one or more remote servers, and generating and displaying a real-time programming guide user-interface including the updated content schedule, the real-time programming guide user-interface including at least one content segment component corresponding to at least one of the content segment data in the updated content schedule, and at least one prior content segment component corresponding to at least one of the prior portion of the live digital audio stream.

10. The method of claim 9, wherein the programming guide criteria includes a criterion that is met when the one or more servers identifies a content start metadata tag and a subsequent content end metadata tag in the live digital audio stream.

11. The method of claim 9, wherein the content segment data includes at least one of content title data, content start data, and content end data.

12. The method of claim 9, wherein the content segment component includes a display of the content title data, content start data, and content end data.

13. The method of claim 9, wherein the one or more remote servers are further configured to store each metadata tag of the plurality of metadata tags while receiving the live digital audio stream.

14. The method of claim 9, wherein the one or more remote servers include a live media content server, a time-shifted media content server and an alternative content server.

15. The method of claim 14, wherein the live media content server is configured to modify a pre-modified digital audio stream to create the live digital audio stream and stream the live digital audio stream to the client device, wherein the time-shifted media content server is configured to store the pre-modified digital audio stream and stream the pre-modified digital audio stream as a time-shifted audio stream to the client device, wherein the alternative content server is configured to receive the live digital audio stream, identify and store the plurality of metadata tags, and transmit the at least one of the plurality of metadata tags to the client device.

16. The method of claim 9, further comprising, at the client device, receiving and outputting the at least one prior portion of the live digital audio stream, in response to a content selection command at the at least one prior content segment component.

* * * * *